United States Patent [19]

Lee

[11] Patent Number: 5,243,473
[45] Date of Patent: Sep. 7, 1993

[54] AUTOMATIC HELICAL SCAN HEAD DRUM CALIBRATION AND TRACK TIMING GENERATION

[75] Inventor: David R. Lee, San Jose, Calif.
[73] Assignee: R-Byte, Inc., San Jose, Calif.
[21] Appl. No.: 740,791
[22] Filed: Aug. 6, 1991
[51] Int. Cl.[5] ................... G11B 20/10; G11B 15/087
[52] U.S. Cl. ................................. 360/69; 360/75; 360/77.13
[58] Field of Search ............... 365/69, 75, 77.13, 77.17

[56] References Cited

U.S. PATENT DOCUMENTS

| | | | |
|---|---|---|---|
| 4,197,564 | 4/1980 | Ravizza | 360/77.17 |
| 4,318,142 | 3/1982 | Ravizza | 360/77.13 |
| 5,103,354 | 4/1992 | Singhoff et al. | 360/75 |
| 5,107,380 | 4/1992 | Fujiki et al. | 360/69 |

Primary Examiner—John S. Heyman
Attorney, Agent, or Firm—Lyon & Lyon

[57] ABSTRACT

This invention is a method and apparatus for the automatic calibration of the magnetic head offset angles in a helical scan rotating head drum and the generation of idealized track timing for recording and reading magnetic tape. A calibration tape is used to provide calibration marks and in conjunction with pulse generator (PG) encoder and frequency generator (FG) encoder signals, a processor calculates the offset angles. The offset is calculated from the time an FG signal edge occurs until the time of detection of a calibration feature. For a read head calibration, this provides a rough calibration of the angular location of the read head on the head drum. Using this rough calibration, data is read from the calibration tape, including the measured longitudinal position of the calibration feature. An accurate calibration of the angular location of the read head is then calculated. For the write head, tracks are written on a blank sector of the calibration tape, using the known relative angular location of the read head, an accurate calibration of the angular location of the write head (which just wrote the track) is thereby provided. The same circuitry can also generate track timing signals based on the edges of the FG signal.

14 Claims, 2 Drawing Sheets

AUTOMATIC HELICAL SCAN HEAD DRUM CALIBRATION AND TRACK TIMING GENERATION

FIELD OF THE INVENTION

The present invention relates generally to the field of magnetic tape recording and more particularly to automatic calibration and track timing of helical scan rotating head drums.

BACKGROUND OF THE INVENTION

In helical scanning magnetic tape recording systems, tracks are laid diagonally across the magnetic tape medium by means of a rotating cylindrical head drum having at least one magnetic read/write head embedded in the drum surface and magnetic tape wrapped helically around the head. The angle of the track is fixed by the geometry of the system and the relative tape and head speeds. The placement of the longitudinal component of the track is determined by the wrap angle of the tape around the head and the timing of head activation for recording signals onto the tape. For recording, it is imperative to energize the write head over an accurate angular range of the head drum rotation to place the track precisely on the tape. Similarly, for reading, it is necessary to activate the reading circuits over an accurate angular range of the head drum rotation in order to sense the entire length of the track recorded on the tape. To accurately write and read data, then, it is necessary to calibrate the system for the angular information. In high density helical scan recording, this calibration must be performed at a much higher level of accuracy than that achieved in prior art systems which relied primarily on mechanical specifications.

Prior art calibration of helical scan head drum angles typically utilized an electrical encoder such as a Hall sensor or coil fixed to the stator of the drum motor to sense the position of the rotor of the drum motor using a magnet or a series of magnetic poles fixed to the rotor. The output of the encoder is amplified and transmitted through electrical circuits to generate track timing. Using a calibration tape or other reference device, an adjustable element (for example, a trimming potentiometer) in the electrical circuit is manually controlled by a technician to adjust the circuit timing to match the track timing. In a multiple-head drum, this step must be repeated for each head.

Some prior art helical scanning head drum calibration systems include two encoders. One encoder generates a "pulse generator" (PG) signal being a single detectable feature (typically a pulse) for every complete revolution of the head drum. The second encoder generates a "frequency generator" (FG) signal which is a series of detectable features (typically a sine wave) having a predetermined number of cycles for every complete revolution of the head drum (for example 24 cycles per revolution). The FG encoder normally provides higher accuracy angular information than the PG encoder. Therefore, the typical procedure is to first detect the PG encoder signal to identify a particular approximate angle on the head drum and to then detect the next feature of the FG encoder signal to add greater accuracy and resolution to the angular information. Such calibration systems have the disadvantage of circuit complexity resulting from circuit designs necessary to implement the aforesaid procedure.

SUMMARY OF THE INVENTION

Accordingly, it is a principal object of the present invention to provide an improved calibration system and method for magnetic recording systems.

It is a further object of the present invention to provide a low-cost, low-complexity, reliable, automatic calibration system and method for helical scan magnetic recording systems.

This invention is a method and apparatus for the automatic calibration of the magnetic head offset angles in a helical scan head drum and the generation of idealized track timing for recording and reading magnetic tape. The system operates on a helical scan head magnetic tape recording system having read and write heads mounted on a rotating head drum and coupled respectively to read and write channels which in turn is coupled to a system interface for transmitting information. A tape drive mechanism transports a magnetic tape over the head drum. The automatic calibration system comprises the following elements: a calibration tape having a pre-recorded calibration feature; a pulse generator (PG) encoder, coupled to the head drum, for generating a PG signal having a salient feature related to the rotation of the head drum; a frequency generator (FG) encoder, coupled to the head drum, for generating a FG signal having a predetermined number of cyclic detectable features for every complete revolution of the head drum; a detector, coupled to the PG encoder, for detecting the PG salient feature; a latch, coupled to the detector, for digitizing the PG signal by changing state upon detection of the PG salient feature; a latch state detector, coupled to the latch, for detecting the state of the latch; a latch clear unit, coupled to the latch, for clearing the state of the latch; an edge detector, coupled to the FG encoder, for detecting an edge of the FG signal; a time-stamper, coupled to the FG encoder, for recording the time of detection of an edge of the FG signal; a feature circuit, coupled to the read channel, for detecting the pre-recorded calibration feature on the calibration tape and for generating a FEATURE signal thereupon; and a calibration FEATURE signal detector, coupled to the FG encoder, for detecting the FEATURE signal.

The method of the present invention comprises a sequence of steps designed to achieve simple yet accurate calibration and track timing utilizing the above invention elements.

Calibration and track timing generation is achieved primarily from a software/firmware implementation resulting in fewer electronic components, simpler circuitry, smaller size and consequently, a more reliable system having greater ease of manufacture and higher accuracy. The automatic calibration and track timing generation eliminates the need for manual adjustments. This results in faster and more precise manufacturing thereby achieving lower costs and higher quality. Further, because there are no manual adjustments required, the possibility of the adjustments changing after use in the field, which is a common problem in trimmer potentiometer circuits, is eliminated.

A further understanding of the nature and advantages of the present invention may be realized by reference to the Detailed Description of the Invention and the attached drawings.

DETAILED DESCRIPTION OF THE INVENTION

Figure 1:
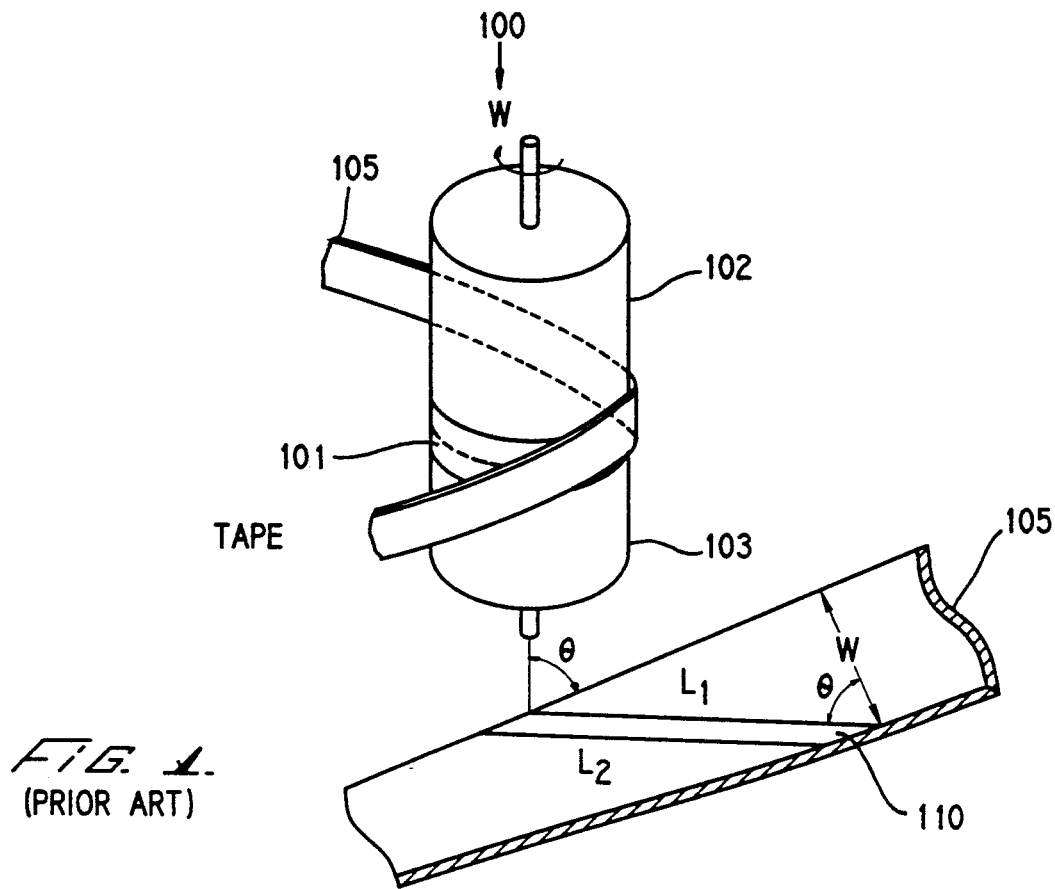
FIG. 1 is a prior art rotating head for read and write.

A typical prior art rotating head for read and write operations is shown in FIG. 1 at 100. A rotating, helical-scan head 101 is embedded between stationary upper and lower mandrels 102 and 103 with the tape 105 helically wrapped around mandrels 102 and 103. The tape moves at a lower angular velocity than the rotating head to produce helically-written data 110 of very high spatial density because of close track spacing. Addressing the closely-spaced tracks then requires accurate control of the linear positions of the tape around the head unit. By pressurizing the mandrels the tape is hydrostatically supported over the head by an air film at higher tape speeds. Tape speeds may be as high as 40 m/s in rotating head-helical scan systems. At such high data densities and tape speeds, accurate sensing requires precise head and tape speeds control and tape tracking control.

The present invention is implemented in its preferred embodiment as the calibration and track timing generation system for a DDS system as described in System application Ser. No. 07/741,783 which is hereby incorporated by reference and for an automatic track follower (ATF) system as described in ATF application Ser. No. 07/741,088 which is hereby incorporated by reference.

Figure 2:
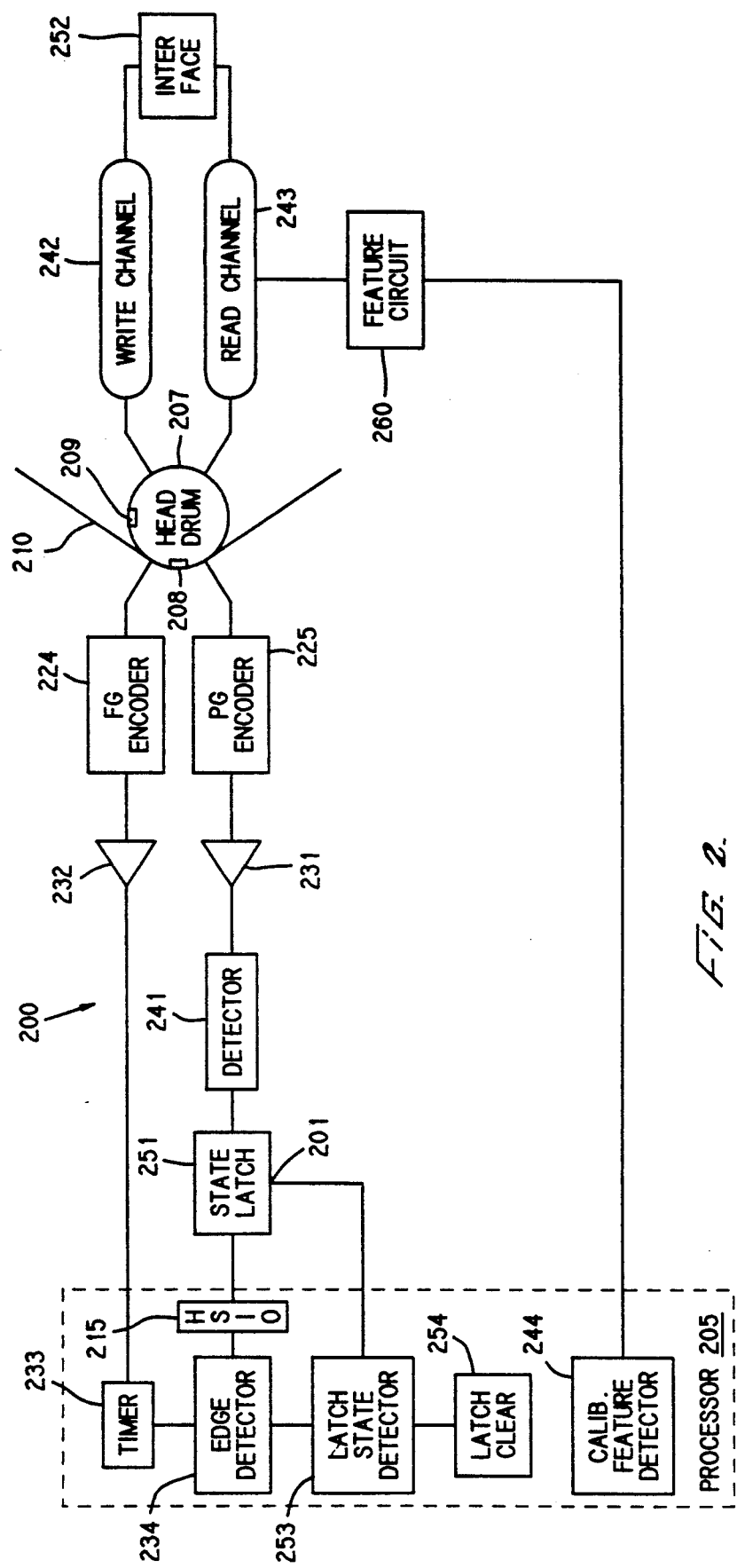
FIG. 2 is a block diagram of an automatic calibration/track-timing-generation system according to the present invention.

FIG. 2 is a schematic block diagram of an automatic calibration/track-timing-generation system 200 according to the present invention. A pulse generator (PG) encoder 225 and frequency generator (FG) encoder 224 are coupled to a head drum 207 which is in communication with a calibration tape 210 via at least one read head 208 and at least one write head 209. PG encoder 225 is coupled to an amplifier 231 which is coupled to a detector 241 which in turn is coupled to a latch 251 which is coupled to a microcontroller 205 at latch state detector 253. Latch clear 254 in microcontroller 205 is coupled to latch 251 at clear 201. FG encoder 224 is coupled to an amplifier 232 which is coupled to microcontroller 205 through an edge detector 233 and a time stamper 234. Head drum 207 is further coupled to a write channel 242 and a read channel 243. Read channel 243 includes an analog feature circuit 260 which is coupled to microcontroller 205 at a calibration feature detect unit 244. Write channel 242 and read channel 243 are further coupled to an interface unit 252. A tape drive (as shown in FIG. 1) including supply and take-up reels, capstans, pinch rollers, and tension sensors mechanically transports the tape over drum head 207.

In operation, PG encoder 225 generates an analog PG signal which is transmitted to amplifier 231 and thence to detector 241 which detects the salient feature of the PG signal. In the preferred embodiment, the salient feature is a low-to-high transition of the signal—a pulse. The detection of the pulse causes latch 251 to assume a "1" state. The analog signal has thereby become digitized. The digitized signal is transmitted to microcontroller 205. Microcontroller 205 detects the state of latch 251 utilizing latch state detector 253. Latch clear 254 returns latch 251 to a "0" state under instruction from microcontroller 205. FG encoder 224 generates an analog FG signal which is amplified by amplifier 232 and transmitted to edge detector 234 and time-stamper 233 in microcontroller 205. Microcontroller 205 detects the FG signal edges and the time at which the edges occur. Feature circuit 260 detects a pre-recorded calibration feature on the magnetic tape and generates a "feature" signal upon detection. Calibration feature detector 244 in microcontroller 205 senses the calibration feature. In the preferred embodiment, the calibration feature is the beginning of the tracking servo field in the DDS standard tape format (which format is known to those skilled in the magnetic tape encoding art). It will be appreciated that any given feature on the magnetic tape can be advantageously utilized and thus is within the scope of the present invention.

In the preferred embodiment, a calibration tape is utilized in the procedure described below. It will be appreciated that various different tape types may be advantageously used and are within the scope of the invention.

The first step of a calibration procedure according to this invention is to load a calibration tape having a calibration feature for reading. A command to execute a head drum calibration procedure is transmitted to microcontroller 205. Head drum 207 is spun up to read operation angular speed. Microcontroller 205 continually monitors the FG signal for the angular rotation of head drum 207. After clearing latch 241, microcontroller 205 waits for the next transition of the FG signal. Upon occurrence thereof, the next FG transition is identified as "edge 0" and subsequent transitions of the FG signal are identified as "edge 1", "edge 2", and so on, in ordinal sequence, modulo the number of edges per revolution head drum 207. Edge 0 thus always occurs at the same angular location of head drum rotation.

As the tape runs at the desired speed and tension for reading, microcontroller 205 activates the feature circuitry and awaits detection of the feature signal. Upon detection, microcontroller 205 calculates the offset from the time edge 0 occurs on the FG signal until the time of detection of the calibration feature. Calculations of this nature are known in the microprocessor arts. This provides a rough calibration of the angular location of read head 208 on head drum 207. Using this rough calibration, data is read from calibration tape 210. Microcontroller 205 then calculates an accurate calibration of the angular location of read head 208 on head drum 207. Microcontroller 205 then repeats the procedure described in this paragraph for each read head 208 on head drum 207.

The preferred embodiment of calibration tape 210 utilizes a standard Digital Audio Tape (DAT) written in the standard DDS format, but with specialized information in the data section of the tape. Tape 210 includes in the data stream the value of the precise longitudinal position of the calibration feature. In this way, the present invention does not require a highly precise system to generate the calibration tapes. It is not important that the calibration feature be accurately placed in a particular absolute position, but only that the position be known accurately. Microcontroller 205 removes the effects of a any variation in the position of the calibration feature in different calibration tapes.

Next, the angular location of write head 209 is next calibrated. The approximate angular locations of write heads such as 209 are known relative to the location of read head 208 from the manufacturer's specification.

Microcontroller 205 instructs the tape drive to space write head 209 to the blank area at the end of calibration tape 210. A predetermined number of tracks are then written on calibration tape 210 by write head 209, the tracks including the calibration feature, under instruction from microcontroller 205. Next, the tape drive spaces backwards to the beginning of the area just written under instruction from microcontroller 205. As calibration tape 210 reaches a desired speed and tension for reading, microcontroller 205 activates the feature circuitry and awaits detection of the feature signal. Upon detection, microcontroller 205 calculates the offset from the time edge 0 occurs on the FG signal until the time of detection of the calibration feature. Using the known relative angular location of read head 208, an accurate calibration of the angular location of write head 209 (which just wrote the track) is provided. The steps of this paragraph are repeated for each write head.

In an alternate embodiment, the steps of spacing backwards the tape drive to the beginning of the area just written and reaching a desired speed and tension for reading can be done using read-after-write (RAW) functionality. For details of RAW, see the System and Formatter applications referenced above.

Figure 3:
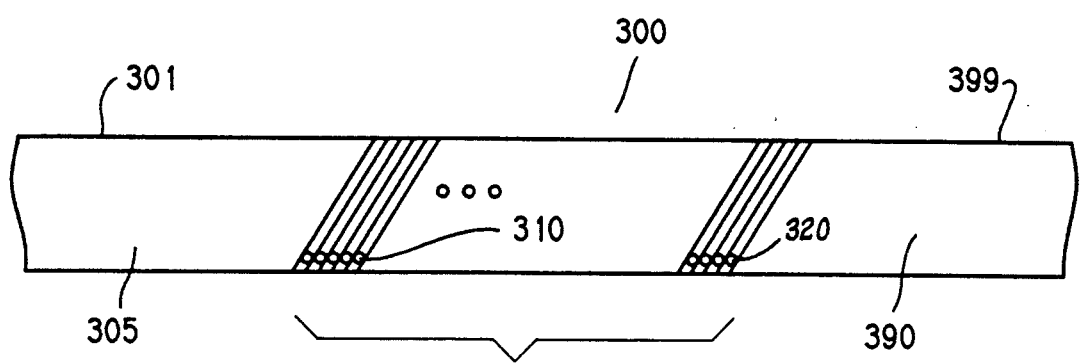
FIG. 3 shows an exemplary calibration tape according to the present invention.

An exemplary calibration tape is shown in FIG. 3 at 300. After a beginning of tape 301, a data area 320 includes calibration features designated 310 in this example. Before an end of tape 399, there is a blank area 390 for the write head calibration.

The results of the calibration are stored in non-volatile memory in microcontroller 205 so that the read and write head calibrations need not be repeated at every power-up. If head drum 207 is changed, if the non-volatile memory loses its information, or if a new non-volatile memory is installed, the calibration must of course be repeated.

The calibrated information about the angular locations of the heads on head drum 207 can be utilized to generate accurate, idealized track timing strobes. Such strobes are generated as offsets to edge 0 of the FG input signal. For example, an edge of a timing strobe may be scheduled to change t microseconds after the $n^{th}$ FG encoder edge after edge 0. This edge is thus accurately locked to the angular position of the read and write heads, which positions have already been calibrated relative to FG edge 0. In the preferred embodiment, the following track timing signals are used: (1) TRACK CLOCK (used to trigger read/write sequencer hardware) changes from 0 to 1 at the accurate, ideal beginning of each read track and from 1 to 0 at the accurate ideal beginning of each write track. (2) ATF WINDOW (used to activate tracking hardware) which is a logic 1 during the time that the tracking servo information is passing under read head 208 for each read track, and is a logic 0 at all other times. A code to generate the track timing strobes causes the TRACK CLOCK signal to switch at the appropriate angle on head drum 207.

In one embodiment, the present invention operates in a DDS/DAT system having a controller which includes a high speed input/output (HSIO) unit 215 which captures and time-stamps events on input and generates time-driven events on output without firmware intervention. The high-speed input is used on the FG input signal to acquire more accurate timing information than possible under solely firmware instruction. This is because HSIO 215, in this embodiment, operates directly from a high speed clock with 2 microsecond resolution. Firmware-generated timing, in contrast, is limited to resolutions in the range of 50 to 300 microseconds (because of execution speeds of program loops and non-deterministic delays from interrupt routines). The high-speed output is used to generate track timing strobes having greater accuracy than that possible using firmware alone.

In an alternate embodiment, the present invention operates solely under firmware control and does not require HSIO circuitry in the controller.

An embodiment of this invention can be found in Digital Data Tape Storage System Model RB100 manufactured by R-Byte of San Jose, Calif.

While the above description provides a full and complete description of the preferred embodiments of the present invention, various modifications, alternate constructions, and equivalents may be employed while still remaining within the scope of the invention. For example, a system having any number of heads may be advantageously calibrated, and any type of calibration feature may be utilized in any suitable calibration tape. Therefore, the above description and illustrations should not be construed as limiting the scope of the invention which is defined by the following claims.

What is claimed is:

1. An automatic calibration system for calibrating helical scan head offset angles in a magnetic tape recording and reading system having at least one write head and at least one read head, mounted on a rotating head drum and coupled respectively to at least one write channel and at least one read channel coupled to a system interface for transmitting information, and a tape drive mechanism for transporting a magnetic tape relative to the head drum, said calibration system comprising:

a calibration tape having a pre-recorded calibration feature and the measured longitudinal position of the calibration feature;

a pulse generator (PG) encoder means, coupled to the head drum, for generating a PG signal having a salient feature related to the rotation of the head drum;

a frequency generator (FG) encoder means, coupled to the head drum, for generating a FG signal having a predetermined number of cyclic detectable features for every complete revolution of the head drum;

detector means, coupled to said PG encoder means, for detecting the PG salient feature;

latch means, coupled to said detector means, for digitizing the PG signal by changing state upon detection of the PG salient feature;

a latch state detector, coupled to said latch means, for detecting the state of said latch means;

latch clearing means, coupled to said latch means, for clearing the state of said latch means;

edge detector means, coupled to said FG encoder means, for detecting an edge of the FG signal;

time-stamping means, coupled to said FG encoder means, for recording the time of detection of an edge of the FG signal;

feature circuit means, coupled to the read channel, for detecting said pre-recorded calibration feature on said calibration tape and for generating a feature signal thereupon; and calibration feature signal detector means, coupled to said feature circuit means, for detecting said feature signal.

2. The automatic calibration system of claim 1 wherein the salient PG signal feature is a pulse.

3. The automatic calibration system of claim 1 wherein the FG signal is a sine wave.

4. The automatic calibration system of claim 1 wherein a single processor means includes said latch state detector, said latch clearing means, said edge detector means, said time-stamping means, and said calibration feature signal detector means.

5. The automatic calibration system of claim 1 wherein said calibration feature on said calibration tape is disposed at the beginning of a tracking servo field in the DDS standard tape format.

6. The automatic calibration system of claim 1 wherein said calibration system is utilized for generating track timing signals from an edge of the FG signal.

7. In a helical scan magnetic tape recording and reading system having at least one write head and at least one read head, mounted on a rotating head drum and coupled respectively to at least one write channel and at least one read channel coupled to a system interface for transmitting information, a tape drive mechanism for transporting a magnetic tape relative to the head drum, a method for calibrating the helical scan magnetic recording and reading system comprising the steps of:
recording a calibration feature and the measured longitudinal position of said calibration feature on a calibration tape having a blank area proximate its end and calibrating the angular position of the read head by:
(a) loading said calibration tape for reading by the tape system;
(b) spinning the head drum to read operation angular speed;
(c) determining the angular rotation of the head drum from the PG signal;
(d) detecting the next transition of the FG signal and identifying it as "edge 0" and identifying subsequent transitions of the FG signal as "edge 1", "edge 2", and so on, in ordinal sequence, modulo the number of edges per revolution of the head drum such that edge 0 always occurs at the same angular location of the head drum rotation;
(e) detecting said recorded calibration feature on said calibration tape;
(f) calculating the offset from the time edge 0 occurs on the FG signal until the time of detection of said calibration feature, thereby providing a rough calibration of the angular location of the read head on the head drum;
(g) reading data, including the measured longitudinal position of said calibration feature, from said calibration tape using the rough calibration of step (f);
(h) calculating an accurate calibration of the angular location of the read head on the head drum by utilizing the measured longitudinal position of said calibration feature;
(i) repeating steps (e) through (h) for each read head.

8. In a helical scan magnetic tape recording and reading system having at least one write head and at least one read head, mounted on a rotating head drum and coupled respectively to at least one write channel and at least one read channel coupled to a system interface for transmitting information, a tape drive mechanism for transporting a magnetic tape relative to the head drum, a method for calibrating the helical scan magnetic recording and reading system comprising the steps of:
recording a calibration feature and the measured longitudinal position of said calibration feature on a calibration tape having a blank area proximate its end and calibrating the angular location of the write head by:
(a) determining the approximate angular locations of the write heads relative to the location of read head from the manufacturer's specification;
(b) spacing the write head to said blank area at the end of said calibration tape;
(c) writing a predetermined number of tracks on said calibration tape by the write head, the tracks including said calibration feature;
(d) spacing said calibration tape backwards to the beginning of the area just written;
(e) spinning the head drum to read operation angular speed;
(f) detecting said calibration feature;
(g) calculating the offset from the time edge 0 occurs on the FG signal until the time of detection of said calibration feature,
(h) using the known relative angular location of the read head, determining an accurate calibration of the angular location of the write head; and
(i) repeating steps (g) through (h) for each write head.

9. In a helical scan magnetic tape recording and reading system having at least one write head and at least one read head, mounted on a rotating head drum and coupled respectively to at least one write channel and at least one read channel coupled to a system interface for transmitting information, a tape drive mechanism for transporting a magnetic tape relative to the head drum, a method for calibrating the helical scan magnetic recording and reading system comprising the steps of:
recording a calibration feature and the measured longitudinal position of said calibration feature on a calibration tape having a blank area proximate its end;
(I) calibrating the angular position of the read head by:
(a) loading said calibration tape for reading by the tape system;
(b) spinning the head drum to read operation angular speed;
(c) determining the angular rotation of the head drum from the PG signal;
(d) detecting the next transition of the FG signal and identifying it as "edge 0" and identifying subsequent transitions of the FG signal as "edge 1", "edge 2", and so on, in ordinal sequence, modulo the number of edges per revolution of the head drum such that edge 0 always occurs at the same angular location of the head drum rotation;
(e) detecting said recorded calibration feature on said calibration tape;
(f) calculating the offset from the time edge 0 occurs on the FG signal until the time of detection of said calibration feature, thereby providing a rough calibration of the angular location of the read head on the head drum;
(g) reading data, including the measured longitudinal position of said calibration feature, from said calibration tape using the rough calibration of step (f);
(h) calculating an accurate calibration of the angular location of the read head on the head drum by utilizing the measured longitudinal position of said calibration feature;
(i) repeating steps (e) through (h) for each read head;

(II) calibrating the angular location of the write head by:

(j) determining the approximate angular locations of the write heads relative to the location of read head from the manufacturer's specification;

(k) spacing the write head to said blank area at the end of said calibration tape;

(l) writing a predetermined number of tracks on said calibration tape by the write head, the tracks including said calibration feature;

(m) spacing said calibration tape backwards to the beginning of the arc just written;

(n) spinning the head drum to read operation angular speed;

(o) detecting said calibration feature;

(p) calculating the offset from the time edge 0 occurs on the FG signal until the time of detection of said calibration feature, (q) using the known relative angular location of the read head, determining an accurate calibration of the angular location of the write head; and (r) repeating steps (o) through (q) for each write head.

10. The method of claim 9 comprising the further step of storing the results of the calibration in non-volatile memory so that the read and write head calibrations need not be repeated at every power-up.

11. The method of claim 9 wherein every step is performed by a single processor means.

12. In a helical scan magnetic tape recording and reading system having at least one write head and at least one read head, mounted on a rotating head drum and coupled respectively to at least one write channel and at least one read channel coupled to a system interface for transmitting information, a tape drive mechanism for transporting a magnetic tape relative to the head drum, a method for generating track timing strobes comprising the steps of:

recording a calibration feature and the measured longitudinal position of said calibration feature on a calibration tape having a blank area proximate its end;

(a) loading said calibration tape for reading by the tape system;

(b) spinning the head drum to read operation angular speed;

(c) monitoring the FG signal for the angular rotation of the head drum;

(d) detecting the next transition of the FG signal and identifying it as "edge 0" and identifying subsequent transitions of the FG signal as "edge 1", "edge 2", and so on, in ordinal sequence, modulo the number of edges per revolution of the head drum such that edge 0 always occurs at the same angular location of the head drum rotation;

(e) generating timing strobes at predetermined time offsets to edge 0 of the FG input signal, thereby providing track timing signals.

13. The track timing generation method of claim 12 for use in a magnetic tape recording and reading system having a read/write sequencer wherein a TRACK CLOCK signal is generated in step (f) for triggering the read/write sequencer changes, said TRACK CLOCK signal changing from 0 to 1 at the accurate, ideal beginning of each read track and from 1 to 0 at the accurate ideal beginning of each write track.

14. The track timing generation method of claim 12 for use in a magnetic tape recording and reading system having a tracking circuit wherein an ATF WINDOW signal is generated for activating the tracking circuit, said ATF WINDOW signal being a logic 1 during the time that the tracking servo information is passing under the read head for each read track, and is a logic 0 at all other times.

* * * * *